United States Patent [19]

Bennett et al.

[11] Patent Number: 5,381,664
[45] Date of Patent: Jan. 17, 1995

[54] NANOCOMPOSITE MATERIAL FOR MAGNETIC REFRIGERATION AND SUPERPARAMAGNETIC SYSTEMS USING THE SAME

[75] Inventors: Lawrence H. Bennett, Bethesda; Robert D. Shull, Boyds, both of Md.

[73] Assignee: The United States of America, as represented by the Secretary of Commerce, Washington, D.C.

[21] Appl. No.: 10,310

[22] Filed: Jan. 28, 1993

Related U.S. Application Data

[62] Division of Ser. No. 589,750, Sep. 28, 1990, abandoned.

[51] Int. Cl.⁶ .................................. F25B 21/00
[52] U.S. Cl. ........................ 62/3.1; 252/62.55
[58] Field of Search .................. 62/3.1; 252/62.55

[56] References Cited

U.S. PATENT DOCUMENTS

| 3,042,543 | 7/1962 | Schuele | 252/62.55 |
|---|---|---|---|
| 4,107,935 | 8/1978 | Steyert, Jr. | 62/3.1 |
| 4,113,658 | 9/1978 | Geus | 252/62.55 |
| 4,199,614 | 4/1980 | Ziolo | 252/62.55 |
| 4,367,257 | 1/1983 | Arai et al. | 252/62.55 |
| 4,829,770 | 5/1989 | Hashimoto | 62/3.1 |
| 4,985,072 | 1/1991 | Sahashi et al. | 252/62.55 |
| 4,995,999 | 2/1991 | Nakada et al. | 252/62.55 |
| 5,060,478 | 10/1991 | Fukamichi | 62/3.1 |
| 5,186,765 | 2/1993 | Arai et al. | 62/3.1 |

FOREIGN PATENT DOCUMENTS

| 327293 | 8/1989 | European Pat. Off. |  |
| 1-140603 | 6/1989 | Japan | 252/62.55 |

OTHER PUBLICATIONS

Shull et al. "Multicomponent Ultrafine Microstructures, MRS Symposium Proceedings", North Holland Pub. Co., vol. 132 (1988) p. 179.
Paper titled "Magnetic Heat Pumping Near Room Temperature", by G. V. Brown, Journal of Applied Physics, vol. 47, No. 8, Aug. 1976, pp. 3673–3680.

*Primary Examiner*—Ronald C. Capossela
*Attorney, Agent, or Firm*—Lowe, Price, LeBlanc & Becker

[57] ABSTRACT

A nanocomposite superparamagnetic material that includes nanosize particles of a magnetic component, preferably a rare earth and a transition element, dispersed finely within a bulk matrix component provides finely dispersed magnetic clusters, whereby a high magnetocaloric effect is obtained in using the nanocomposite material in a conventional magnetic refrigeration system. In one aspect of the present invention, an element formed of such a nanocomposite superparamagnetic material is reciprocated into and out of a heat exchanger within a controlled magnetic field and is in heat transfer communication with a second heat exchanger to facilitate the production of a refrigeration heat transfer effect thereby. In another aspect of the present invention, a generally disk-like element formed of the nanocomposite superparamagnetic material is rotated so that portions thereof move between a first heat exchanger and a second heat exchanger that is within a controlled magnetic field, to thereby perform refrigeration heat transfer between the two heat exchangers.

29 Claims, 2 Drawing Sheets

NANOCOMPOSITE MATERIAL FOR MAGNETIC REFRIGERATION AND SUPERPARAMAGNETIC SYSTEMS USING THE SAME

This application is a divisional, of application Ser. No. 07/589,750, filed Sep. 28, 1990, now abandoned.

TECHNICAL FIELD

This invention relates to magnetic materials suitable for use in magnetic refrigeration systems and, more particularly, to atomically-engineered nanocomposite superparamagnetic materials that exhibit a large magnetocaloric effect at selected temperatures.

BACKGROUND ART

Magnetic refrigeration utilizes so-called magnetocaloric effect in a magnetic material to perform the same task that a gas such as ammonia or freon does in a conventional refrigeration system. The first working magnetic refrigerator was put into use over fifty years ago to achieve ultra-low temperatures, the magnetocaloric effect being obtained in a paramagnetic salt. In 1976, the magnetocaloric effect in a ferromagnetic material near its Curie temperature was used to achieve magnetic refrigeration at higher temperatures.

Materials currently used for magnetic refrigeration fall into two categories:

(1) paramagnetic substances, e.g., $Gd_3Ga_5O_{12}$, gadolinium gallium garnet, generally regarded as suitable for use at temperatures near and below 20° K, and (2) ferromagnetic substances, e.g., Gd, for use at temperatures approaching room temperature.

In both cases, the heat transfer effected between two reservoirs at different temperatures is related to the magnetic spin entropy of the material. As an external magnetic field is adiabatically applied to a material, the magnetic moments of the constituent particles of the material try to align themselves with the external magnetic field, thereby reducing the magnetic entropy of the material and increasing its temperature. The opposite result, i.e., randomizing of the magnetic spins, increased spin entropy and decreased temperature, occurs upon the removal of the external magnetic field.

This "magnetocaloric effect" may be conveniently expressed as a temperature change dT experienced by the magnetic material and can be shown to be proportional to the change in applied magnet field strength dH, the temperature T, and the temperature dependence of the magnetization of the material at constant magnetic field strength, $(dM/dT)_H$. It is also inversely proportional to the material's heat capacity at constant field $C_H$.

The magnetocaloric effect, thus defined, may be expressed as:

$$dT = -(T/C_H)\mu_o V_M (dM/dT)_H dH \qquad (1)$$

where $\mu_o$ is the magnetic permeability of free space, and $V_M$ is the volume of the material. If all the constituent magnetic moments were mutually aligned in the material, then $M=N\mu$, where N is the number of magnetic moments each of value $\mu$.

For a paramagnetic material at any temperature and field the individual magnetic moments are essentially random in orientation, and only partial alignment thereof is achievable by the imposition of an external magnetic field. See FIG. 1A. Hence, for a paramagnetic material which obeys the so-called Curie Law, $$M = (N\mu^2 H)/3k_B T.$$

where $k_B$ is the Boltzmann constant. Consequently, the magnetocaloric effect for such a paramagnetic material may be expressed as follows:

$$dT_{para} = (1/C_H)\mu_o V_M [N(\mu^2)/(3k_B)](H/T)dH \qquad (2)$$

For a ferromagnetic material below its Curie temperature $T_c$, all the magnetic moments are aligned within domains. Consequently, the magnetocaloric effect is near zero for this material below its Curie temperature. See FIG. 1B. However, for a ferromagnetic material above $T_c$ $M=(N\mu^2 H)/[3k_B(T-T_C)]$, and its magnetocaloric effect is as follows:

$$dT_{ferro} = (1/C_H)\mu_o V_M [N(\mu^2)/(3k_B)][HT/(T-T_C)^2]dH \qquad (3)$$

At high temperatures, defined as $T>T_C$ $[HT/(T-T_C)^2]>(H/T)$ and $dT_{ferro}>dT_{para}$ which explains the usefulness of ferromagnetic materials for magnetic refrigeration at relatively high temperatures.

Currently, magnetic refrigerators are not practical for most commercial uses because dT is too small in magnitude. To obtain practical temperature differences, many stages must be used, making the apparatus complicated, expensive, and bulky. Practical magnetic refrigeration, therefore, requires improved magnetic materials, i.e., affordable materials that exhibit a significantly high magnetocaloric effect.

DISCLOSURE OF THE INVENTION

Accordingly, it is a principal object of the present invention to provide a nanocomposite magnetic material exhibiting a high magnetocaloric effect that is suitable for use in magnetic refrigeration systems.

It is a further object of this invention to provide a nanocomposite magnetic material selectively constituted to provide a high magnetocaloric effect at predetermined temperatures.

It is a related object of this invention to provide a magnetic refrigeration system employing a nanocomposite magnetic material of a composition selected to provide an optimum magnetocaloric effect at a selected temperature.

These and other related objects of this invention are realized, according to a preferred embodiment of this invention, by providing a nanocomposite material suitable for manifesting a superparamagnetic function, comprising:

a first constituent, comprising a rare earth element;

a second constituent, comprising a bulk component, wherein said first constituent is in the form of fine particles of nanometer size within a predetermined size range and is dispersed within said second constituent, whereby said first constituent provides finely distributed magnetic clusters within said second constituent in said nanocomposite material.

In another aspect of the invention, there is provided a magnetic refrigeration system comprising:

a first heat exchanger;

a second heat exchanger;

a tubular element disposed with respect to said first and second heat exchangers to be able to perform heat transfer with each, said tubular element containing a heat exchange fluid to facilitate said heat transfers;

a nanocomposite superparamagnetic element supported within said heat exchange fluid so as to be controllably moveable longitudinally within said tubular element between said first and second heat exchangers; and means for providing a controlled magnetic field extending into a region of said tubular element to which said nanocomposite superparamagnetic element is moveable to participate in heat transfer between said heat exchange fluid within said tubular element and said second heat exchanger.

In yet another aspect of the invention, there is provided a magnetic refrigeration system, comprising:

a first heat exchanger;

a second heat exchanger;

means for providing a controlled magnetic field that extends into a heat transfer zone within said second heat exchanger; and an element comprising a nanocomposite superparamagnetic material, supported to be controllably rotatable with a first portion of said magnetic element being in heat transfer communication with said first heat exchanger and a second portion of said magnetic element being in heat transfer communication with said second heat exchanger within said magnetic field, whereby rotation of said magnetic element causes movement of said first and second portions to and from said first and second heat exchangers to facilitate heat exchange therebetween.

Still other objects and advantages of the present invention will become readily apparent to those skilled in the relevant art from the following detailed description, wherein only the preferred embodiments of the invention are shown and described by way of illustration of the best mode for practicing different aspects of the invention. As will be realized, the invention is capable of other and different embodiments, and its several details are capable of modification in various obvious respects without departing from the invention as described. Accordingly, the drawing and description provided herein are to be regarded only as illustrative in nature and not as restrictive, the invention being defined solely by the claims appended hereto.

DETAILED DESCRIPTION OF THE PREFERRED EMBODIMENTS

The present invention presents a new category of materials particularly suitable for use in magnetic refrigeration systems. These materials may be referred to as nanocomposite materials, and are characterized by having selected amounts of a high magnetic moment constituent finely distributed in their compositions. In fact, by appropriate selection of composition and processing parameters, these materials can be formed so as to possess superparamagnetic properties which can be exploited to obtain highly efficient magnetic refrigeration in selected temperature ranges of operation.

Nanocomposite superparamagnetic materials, in the present context, are characterized by possessing nanometer-sized regions of ferromagnetically aligned magnetic moments which interact only slightly with each other above a characteristic interaction temperature $T_I$. The value of the interaction temperature varies with the physical size and distribution of the ferromagnetically-aligned particles. Since the size and distribution of such particles may be chosen in light of a specific application, the final composition and configuration of the nanocomposite superparamagnetic material can be custom-tailored so that a useful element of the material will have a predetermined interaction temperature $T_I$. When the material is at a temperature higher than this intentionally chosen $T_I$, there will be n weakly interacting ferromagnetic regions, each with a magnetic moment $\mu_c = (N/n)\mu$.

The magnetization of a material containing such an assemblage of ferromagnetic regions as a function of temperature and magnetic field strength is represented by:

$$M = n[(N/n)\mu]^2 H/[3k_B(T - T_I)]$$

Consequently, the magnetocaloric effect above a temperature $T_I$ for such a nanocomposite superparamagnetic material may be represented by the following:

$$dT_{nano} = (1/C_H)\mu_o V_M[(n(N/n)^2)(\mu^2)/(3k_B)][HT/(T - T_I)^2)]dH \quad (4)$$

For a given critical temperature, i.e., $T_I = T_C$, equation (4) differs from equation (3) only in the leading term inside the first square bracket. It would be appreciated that since $(n(N/n)^2)$, which equals $N^2/n$, is much larger than N (because n is smaller than N), it follows that:

$$dT_{nano} >> dT_{ferro}$$

As will be appreciated by persons skilled in the relevant art, any magnetic refrigerator utilizing the enhanced magnetocaloric effect according to the present invention will function much more efficiently, and will also be much more practical because of the enhancements and because of the selectability of the interaction temperature $T_I$, as above described, than the system would be with any conventional paramagnetic or ferromagnetic material.

In summary, it should be understood that known magnetic refrigerator systems have all been based on the principle of paramagnetism or ferromagnetism. By contrast, the present invention is intended to employ the principle of superparamagnetism obtained by the use of an atomically-engineered material, i.e., a nanocomposite magnetic material as described more fully hereinbelow. The specific advantages of doing so is that the atomically-engineered material can be tailored to a selected working temperature that is optimum for a given system in light of a particular application and the fact that a significantly larger magnetocaloric effect becomes practically available.

Figure 1A:
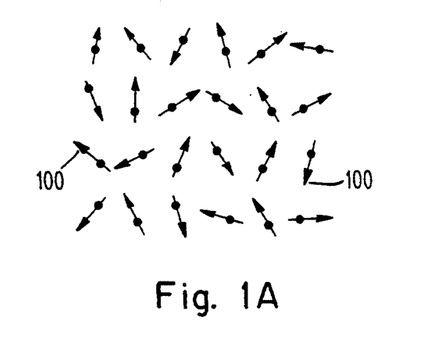
FIGS. 1A, 1B and 1C schematically illustrate the distribution of magnetic spins in paramagnetic, ferromagnetic and superparamagnetic materials, respectively.
Figure 1B:
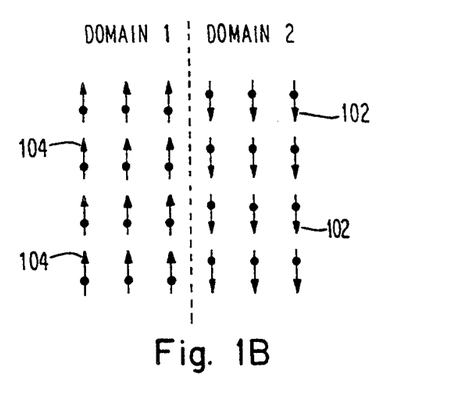
Figure 1C:
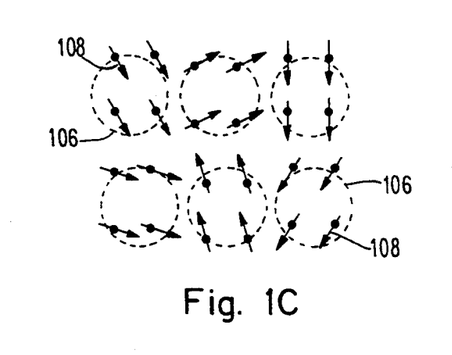

Reference may now be had to FIGS. 1A, 1B and 1C which, schematically, illustrate the distributions of magnetic moments in paramagnetic, ferromagnetic and superparamagnetic materials, respectively. It should be appreciated that paramagnetic and ferromagnetic materials, according to FIGS. 1A and 1B, are the only ones that are utilized currently in magnetic refrigeration systems.

The arrows in FIGS. 1A-1C are intended to denote the directions of the internal magnetic moments of the respective materials. In FIGS. 1A and 1B these may be understood as representing the directions of the atomic magnetic moments. By contrast, FIG. 1C should be understood as illustrating the presence of what may be referred to conveniently as magnetic clusters 106 which are depicted in FIG. 1C by dashed circles. These magnetic clusters 106 are disposed and separated within the bulk matrix constituent 110. These clusters are significantly larger than the individual atoms or molecules of any of the constituents of the superparamagnetic composite material. In fact, the various clusters act as physical elements each having relatively gigantic magnetic moments as compared with the individual atomic magnetic moments in the conventional paramagnetic and ferromagnetic materials.

In a physical element of nanocomposite superparamagnetic material according to this invention, there may be selected amounts of a bulk matrix constituent that is optionally either nonmagnetic or one containing weak magnetic moments disposed between adjacent magnetic clusters.

To summarize, in a conventional paramagnetic material, the individual elemental magnetic moments 100, as best understood with reference to FIG. 1A, are randomly oriented at any temperature and in any given external magnetic field. By comparison, per FIG. 1B, in a conventional ferromagnetic material there will be domains within which the elemental magnetic moments 102 or 104 will be mutually aligned within each domain. By comparison and contrast, per FIG. 1C, in a custom-tailored nanocomposite superparamagnetic material formed according to the present invention there will be clusters 106 within each of which the elemental magnetic moments 108 will be mutually aligned while the orientation of the respective magnetic moments of individual clusters 108 will be relatively randomized when the material is not subjected to an external magnetic field.

The important aspect of a superparamagnetic material constituted according to the present invention is that it will possess clusters of magnetic moments each of which has its internal magnetic moments virtually aligned independently of all the other clusters, thereby providing, in effect, a paramagnetic material with very large effective magnetic moments. In addition, as will be understood, there will be magnetic interactions between the individual clusters themselves. Consequently, the overall magnetocaloric effect obtainable by such a material will depend on (i) the size of the individual clusters, a physical parameter that can be selected, and (ii) the magnitude of the interaction between neighboring clusters, the parameter that can be controlled by selecting the material or materials disposed between neighboring clusters, and the relative proportions of these constituents in the overall material composition.

According to a preferred embodiment of one aspect of the present invention, such a superparamagnetic material comprises one or more nanocomposite materials. Such nanocomposites may be bulk alloys, in the conventional sense, selected to possess a fine dispersion of a magnetic phase, e.g., Co in Cu, Fe in Pd, or Mn in Cu alloys. In the first two cases, fine particles of Co and Fe have precipitated out of either liquid or solid solution with Cu and Pd respectively, while in the latter example fine particles of either Mn or alloy compounds of Cu—Mn are precipitated from solid solution with the Cu. In the alternative, they may be carefully engineered composites of metals and non-metals comprising magnetic particles in sizes on the order of a few nanometers. Examples of the latter materials include composites of silver (Ag) $+Fe_3O_4$ and iron Fe+silica gel. For detailed discussions of such materials, reference may be had to "Magnetic Properties of Thin Film Ag+Iron Oxide Granular Metals", R. D. Shull, U. Atzmony, A. J. Shapiro, L. J. Swartzendruber, L. H. Bennett, W. L. Green, and K. Moorjani, J. Appl. Phys. 63 (1988) p. 4261, and "Magnetic Properties of Iron/Silica Gel Nanocomposites", R. D. Shull, J. J. Ritter, A. J. Shapiro, L. J. Swartzendruber, and L. H. Bennett, *Multicomponent Ultrafine Microstructures*, MRS Symposium Proceedings (edited by L. E. McCandlish, B. H. Kear, D. E. Polk, ad R. W. Siegel), North Holland Pub. Co., Vol. 132 (1988) p. 179, respectively. It should be noted, however, that these two examples of nanocomposite materials are not optimal for magnetic refrigeration uses.

Table 1, presented below, lists materials believed to be suitable for use as the magnetic constituent of the nanocomposite material according to the present invention.

TABLE 1

| Materials Suitable for Use as the Magnetic Constituent | |
|---|---|
| Transition Elements | Cr, Mn, Fe, Co, Ni, V |
| Rare-Earth Elements | La, Ce, Pr, Nd, Pm, Sm, Eu, Gd, Tb, Dy, Ho, Er, Tm, Yb, Cu |
| Actinide Elements | Ac, Th, Pa, U, Ne, Pu, Am, Cm, Bk, Cf, Es, Fm, Md, No, Lr |
| Alloys/Compounds | Tb-Fe, Gd-Fe, Nd-Fe, Gd-Co, Er-Ni, U-Co |
| Oxides/Nitrides | $Fe_4N$, $Fe_5N$, $Fe_3O_4$ |

Table 2, presented below, lists materials believed to be suitable for use as the bulk matrix constituent of the nanocomposite material according to the present invention.

TABLE 2

| Materials Suitable for Use as the Bulk Matrix Constituent | |
|---|---|
| Xerogels | Silica, alumina, yttria, zirconia, hafnia, titania, niobia |
| Metals | Ag, Ad, Cu, Si, Au, Pt, Pd, Rh, Ru, Mo, Nb, Ta, W, Ti, V, Zr, Hf, Y, Re, Ir, Ga, In, Sn, Pb, Zn, Cd, Hg |
| Compounds of Metals | Ag-Al, Cu-Al, Pd-Ag |
| Metal and Semimetal Oxides and Nitrides | $Al_2O_3$, $SiO_2$, BN, NbN, TaN, TiN |
| Weakly Magnetic Metallic Compound | $Fe_2O_3$, CoO, $Ni_3Al$, FeAl |

It is considered that nanocomposites containing constituents selected from Tables I and II, would be more satisfactory candidates for magnetic refrigeration applications because of their inherently larger magnetic moments. In such materials, the sizes of magnetic clusters may be selected by controlling the relative amounts of the various constituents in the composite.

The interaction temperature $T_I$, below which interactions occur between clusters, will also change in accordance with the constituents selected and their proportions in the composite. In addition to the fact that an enhanced magnetocaloric effect is exhibited by such materials close to the corresponding interaction temperature $T_I$ (being the maximum at a temperature equal to $T_I$), the value of $T_I$ may be chosen with relative ease to correspond to the temperature range at which the magnetic refrigeration system is intended to operate.

As noted earlier, the interaction temperature $T_I$ defines a temperature below which long range magnetic ordering of the cluster moments occurs and above which temperature only weak magnetic interactions exist between the clusters. $T_I$ is also the temperature at which the magnetocaloric effect is expected to be a maximum, as may be understood from the fact that equation (4) diverges towards infinity as T approaches $T_I$. $T_I$ varies with the size and identity of the ferromagnetically-aligned particles in the matrix and with the average distance of separation between adjacent clusters. These parameters can obviously be adjusted in forming nanocomposite magnetic materials and using them in a magnetic refrigeration system according to the present invention, e.g., by varying the material composition, changing the magnetic species, and controlling the processing and operational variables.

Since it may be expected that a magnetic refrigerator will be operated in the temperature region near that at which the magnetocaloric effect of the selected material is at a maximum, the class of materials described herein is particularly attractive for use as magnetic refrigerants because of a users freedom to adjust or select the various parameters or optimum results. In short, by proper selection of the materials, the sizes, and the processing variables, the value of $T_I$ may be selected to correspond to the temperature range at which a magnetic refrigeration system utilizing the same is intended to operate.

A preferred size for the particles of the material constituting the magnetic clusters is in the range 1–1000 nm. A preferred distribution is such that a ratio of such particulate magnetic constituent to the bulk matrix constituent within which it is finely dispersed is in the range 1:1000 to 100:1.

Figure 2:
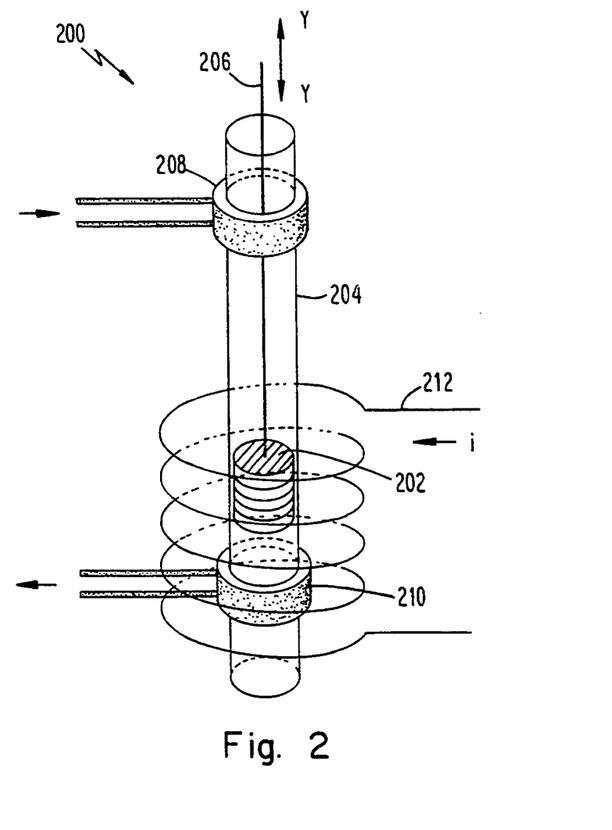
FIG. 2 is a schematic illustration of a preferred embodiment of a refrigeration system utilizing an element of superparamagnetic material according to the present invention.

Reference may now be had to FIG. 2 for an understanding of how a magnetic refrigeration system 200 may be structured and operated to advantageously utilize a physical element 202 comprising a nanocomposite superparamagnetic material according to the present invention. This magnetic refrigeration system 200 is characterized by an operating process involving reciprocating linear motion of nanocomposite element 202 longitudinally within a cylindrical tube 204 filled with a selected heat exchange medium, e.g., helium gas, a liquid freon, a mineral oil, a solid thermal conductor or the like. Conventional means of known type (not shown in FIG. 2), may be utilized to provide controlled reciprocating motion of nanocomposite material element 202 by movement of a rod 206 supporting the same.

As illustrated in FIG. 2, a first heat exchanger coil 208 is disposed around the outside of tube 204. A controlled flow of a heat exchange medium is brought by conventional means (not shown for simplicity), to first heat exchanger coil 208 and leaves after experiencing a transfer with the heat exchange medium contained within tube 204. Conventional means, e.g., pumps, valves, and the like (not shown), may be utilized to regulate the operational parameters of the fluid flow through first heat exchanger coil 208. A generally similar second heat exchanger coil 210 is similarly disposed around the outside of tube 204 at a location based from coil 208 longitudinally of tube 204. A flow of a heat transfer fluid, utilizing known means, is controllably passed through second transfer coil 210 by conventional means to effect heat transfer across the walls of tube 204 with the heat exchange medium contained therein.

It will be readily understood by persons skilled in the thermodynamic and heat transfer arts that even if the nanocomposite material element 202 were not involved or were merely present, the flow of heat transfer fluids through heat exchanger coils 208 and 210 would enable the transfer of heat from one to the other of these coils through the heat exchange medium contained within tube 204. Such a heat transfer, however, could only be from the heat exchange coil which is at the higher temperature to the one which is at a relatively lower temperature. Such a structure, whether operated continuously or cyclically, would be of very little interest and certainly would not effect a refrigeration function. Therefore, also provided to the structure is a magnetic winding 212, comprising a coil of an electrically conducting material (which may be a superconducting material) disposed in a helical form and having a selected number of turns, preferably about the axis of tube 204, whereby the passage of a predetermined electrical current "i" through magnetic winding 212 provides a magnetic field of predetermined strength and direction within tube 204 as well as nanocomposite material element 202 within tube 204.

The operation of a system, as illustrated in FIG. 2 and as described in the immediately preceding paragraphs, follows.

It should be understood that by appropriate conventional control over magnetizing current "i" passed through magnetic winding 212, the magnetic field generated therewithin, as described above, may be varied from a value B=0 to a selected higher value $B=B_o$. Such a magnetic field can also, obviously, be varied as a function of time in a selected manner. The following sequence of individual processes, best understood with reference to FIG. 4, may be employed in cyclic manner to obtain magnetic refrigeration, i.e., the transfer of thermal energy from a low temperature region or reservoir to a relatively high temperature region or reservoir.

Figure 4:
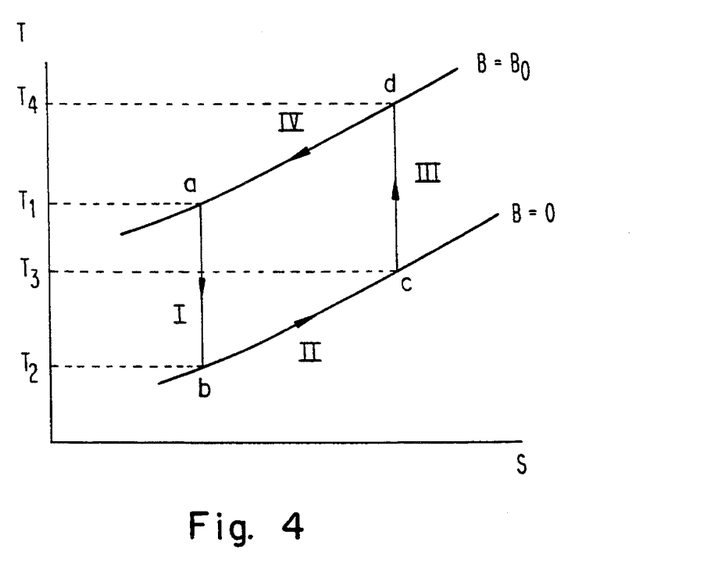
FIG. 4 is a depiction of an idealized magnetic refrigeration cycle on a temperature-entropy plane.

As will be understood with reference no FIG. 4, such a magnetic refrigeration cycle, in idealized form, may be represented on a temperature-entropy, i.e., a T-s plane by four sequential, repeated, processes I–IV through end states a–d.

Assume that nanocomposite element 202 starts at temperature $T_1$ at a state "a" when the externally applied magnetic field is $B=B_o$. In process I, between end states "a" and "b", nanocomposite magnetic element 202 is physically withdrawn from the external magnetic field by being physically moved in an upward direction as understood with reference to FIG. 2. Consequently, as previously explained, the temperature of nanocomposite magnetic element 202 decreases by the magnetocaloric effect to a lower temperature $T_2$, where $T_2 < T_1$.

In the actual device, nanocomposite element 202 would be physically moved linearly so that it is in a position to effect heat transfer with first heat transfer coil 208. Accordingly, through the heat exchange medium within tube 204, heat is transferred from heat exchange coil 208 to the now cooled nanocomposite magnetic element 202. Note that there is no magnetic field around the first heat exchange coil 208. Consequently, this heat transfer process II takes place between end states "b" and "c" along the line characterized as $B=0$ in FIG. 4. This heat transfer continues until the temperature of nanocomposite magnetic element 202 rises to a value $T_3$ corresponding to end state "c". This transfer of energy is accompanied by an increase in the specific entropy of the nanocomposite element 202 between the end states "c" and "b".

The magnetic field in coil 212 has the value $B=B_o$.

Nanocomposite magnetic element 202 is then physically moved into the magnetic field in process III between end states "c" and "d". In this process, as explained previously, the temperature of nanocomposite magnetic element 202 increases due to the magnetocaloric effect from $T_3$ to this highest value, i.e., $T_4$.

In process IV, between end state "d" at temperature $T_4$ and end state "a" at temperature $T_1$, heat is transferred from nanocomposite magnetic element 202, through the heat exchange medium within tube 204, to heat the flow of fluid passed through second heat exchanger coil 210 until the temperature of the nanocomposite element 202 drops back to $T_1$. The thermodynamic refrigeration cycle is thus completed and may be repeated. Since heat is received by nanocomposite element 202 at low temperatures between $T_2$ and $T_3$ and is transferred away from it between higher temperatures $T_4$ and $T_1$, there is obtained a magnetic refrigeration effect as desired.

Figure 3:
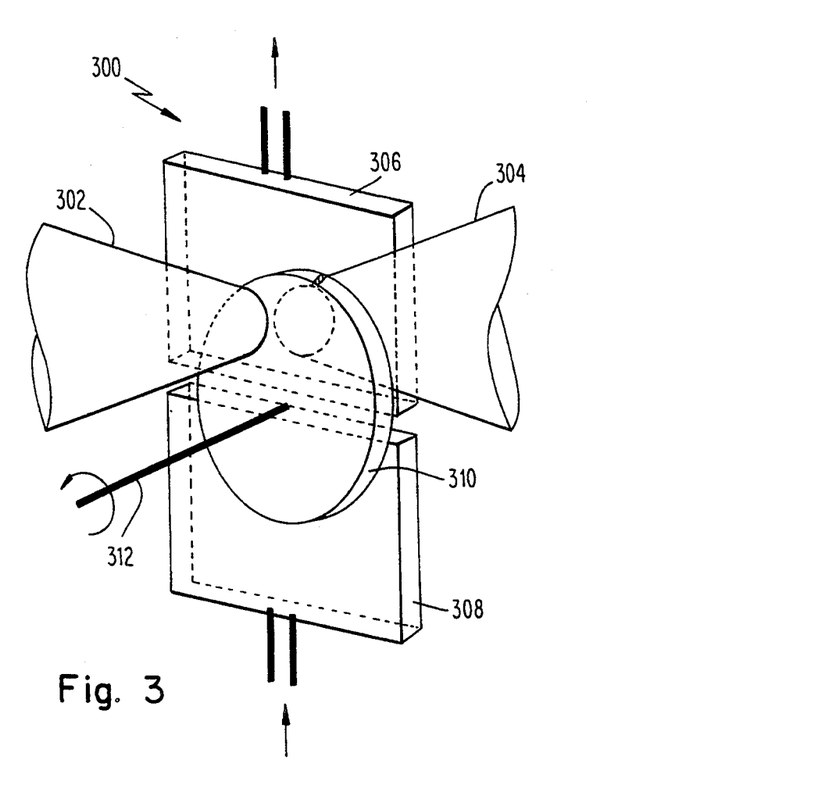
FIG. 3 is a schematic illustration of a second preferred embodiment of a refrigeration system also advantageously employing an element of superparamagnetic material according to this invention.

An alternative embodiment 300 is illustrated in FIG. 3. In this embodiment, a controlled magnetic field is generated between magnetic pole pieces 302 and 304 disposed with respect to the heat exchanger 306 so that the magnetic field between pole pieces 302 and 304 is present within heat exchanger 306. A second heat exchanger 308 is disposed so that the magnetic field between pole pieces 302 and 304 does not pass therethrough, as illustrated in FIG. 3.

A disk-like or ring-like element 310 comprising a nanocomposite superparamagnetic material according to this invention is disposed to rotate in thermal communication with heat exchangers 306 and 308 about an axis 312 around which it is rotated, as indicated by the curved arrow, by conventional means (not shown), at a controlled rate. It will be understood that as element 310 rotates, portions thereof move into the magnetic field between magnetic pole pieces 302 and 304 and, as previously described, become heated and give up heat to heat exchanger 306. Subsequently, as element 310 continues to rotate, these portions move into thermal communication with heat exchanger 308 which is not within the magnetic field between magnetic pole pieces 302 and 304. Consequently, the moved portion of rotating nanocomposite magnetic element 310 cools off and, being in thermal communication with heat exchanger 308, receives heat therefrom. As will now be readily understood, controlled rotation of disk-like or ring-like nanocomposite rotating element 310 results in controlled heat transfer between heat exchangers 306 and 308.

In practice, to effect refrigeration, heat is received by the portion of nanocomposite magnetic element 310 that is within heat exchanger 308 at a lower temperature, corresponding to the temperature range $T_2$ through $T_3$ between end states "b" and "c" in the T-s plot of FIG. 4. Heat is transferred out of that portion of rotating nanocomposite magnetic element 310 as it passes between the magnetic pole pieces 302 and 304 and this heat rejection occurs at the higher temperature range between end states "d" and "a" corresponding to the temperature range $T_4-T_1$.

The present invention has potential for extensive use for household refrigeration, as it totally avoids the environmental hazards of the present gas system, and has the facility for providing higher energy efficiency. It will also be applicable to specialized refrigerators, e.g., in space, where compactness, low weight, few moving parts and long-term service-free operation are required. Air conditioners and heat pumps are other logical potential applications.

In this disclosure, there are shown and described only the preferred embodiment of the invention, but, as aforementioned, it is to be understood that the invention is capable of use in various other combinations and environments and is capable of changes or modifications within the scope of the inventive concept as expressed herein.

We claim:

1. A magnetic refrigeration system, comprising:
   a first heat exchanger;
   a second heat exchanger;
   a tubular element disposed with respect to said first and second heat exchangers to be able to perform heat transfer with each, said tubular element containing a heat exchange medium to facilitate said heat transfers;
   a nanocomposite superparamagnetic element supported within said heat exchange medium so as to be controllably moveable longitudinally within said tubular element between said first and second heat exchangers; and
   means for providing a controlled magnetic field extending into a region of said tubular element to which said nanocomposite superparamagnetic element is moveable to participate in heat transfer between said heat exchange medium within said tubular element and said second heat exchanger.

2. A magnetic refrigeration system according to claim 1, wherein:
   said nanocomposite superparamagnetic element comprises a first constituent comprising a magnetic component, and a second constituent comprising a bulk matrix nonmetal component,
   wherein said first constituent is in the form of fine particles of nanometer size within a predetermined size range and said particles are dispersed within said second constituent,
   whereby said first constituent provides finely distributed magnetic clusters within said second constituent in said nanocomposite material.

3. A magnetic refrigeration system, comprising:
   a first heat exchanger;
   a second heat exchanger;
   means for providing a controlled magnetic field that extends into a heat transfer zone within said second heat exchanger; and an element comprising a nanocomposite superparamagnetic material, supported to be controllably rotatable with a first portion of said magnetic element being in heat transfer communication with said first heat exchanger and a second portion of said magnetic element being in heat transfer communication with said second heat exchanger within said magnetic field, whereby rotation of said magnetic element causes movement of said first and second portions to and from said first and second heat exchangers to facilitate heat exchange therebetween.

4. A magnetic refrigeration system according to claim 3, wherein:

said nanocomposite superparamagnetic element comprises a first constituent comprising a magnetic component, and a second constituent comprising a bulk matrix nonmetal component, wherein said first constituent is in the form of fine particles of nanometer size within a predetermined size range and said particles are dispersed within said second constituent, whereby said first constituent provides finely distributed magnetic clusters within said second constituent in said nanocomposite material.

5. A method of transferring heat between two spaced apart locations which comprises the steps of:

a) providing a nanocomposite superparamagnetic material;

b) providing a magnetic field at one of said two spaced apart locations; and c) moving said nanocomposite superparamagnetic material between said two spaced apart locations and through said magnetic field so as to transfer heat between said two spaced apart locations.

6. A method of transferring heat between two spaced apart locations according to claim 5, wherein said nanocomposite superparamagnetic material is moved between said two spaced apart locations by moving said nanocomposite superparamagnetic material in a linear direction.

7. A method of transferring heat between two spaced apart locations according to claim 6, wherein said two spaced apart locations comprise two reservoirs of a refrigeration system and step c) further comprises transferring heat within said refrigeration system.

8. A method of transferring heat between two spaced apart locations according to claim 5, wherein said nanocomposite superparamagnetic material is moved between said two spaced apart locations by rotating said nanocomposite superparamagnetic material.

9. A method of transferring heat between two spaced apart locations according to claim 8, wherein said two spaced apart locations comprise two reservoirs of a refrigeration system and step c) further comprises transferring heat within said refrigeration system.

10. A method of transferring heat between two spaced apart locations according to claim 5, wherein step a) further comprises providing a nanocomposite superparamagnetic material which includes magnetic clusters that are disposed and separated in a matrix constituent.

11. A method of transferring heat between two spaced apart locations according to claim 10, wherein step a) further comprises providing a nanocomposite superparamagnetic material which includes magnetic clusters that comprise a magnetic material selected from a group consisting of Cr, Mn, Fe, Co, Ni, V, La, Ce, Pr, Nd, Pm, Sm, Eu, Gd, Tb, Dy, Ho, Er, Tm, Yb, Ac, Th, Pa, U, Ne, Pu, Am, Cm, Bk, Cs, Es, Fm, Md, No, Lr, Tb—Fe, Gd—Fe, Nd—Fe, Gd—Co, Er—Ni, U—Co, Fe$_4$N, Fe$_5$N, and Fe$_3$O$_4$.

12. A method of transferring heat between two spaced apart locations according to claim 11, wherein step a) further comprises providing a nanocomposite superparamagnetic material which includes a matrix constituent selected from the group consisting of silica, alumina, yttria, zirconia, hafnia, titania, niobia, Ag, Al, Cu, Si, Au, Pt, Pd, Rh, Ru, Mo, Nb, Ta, W, Ti, V, Zr, Hf, Y, Re, Ir, Ga, In, Sn, Pb, Zn, Cd, Hg, Ag—Al, Cu—Al, Pd—Ag, Al$_2$O$_3$, SiO$_2$, BN, NbN, TaN, TiN, Fe$_2$O$_3$, CoO, Ni$_3$Al, and FeAl.

13. A method of transferring heat between two spaced apart locations according to claim 5, wherein step a) further comprises providing a nanocomposite superparamagnetic material which includes magnetic clusters that are disposed and separated in a matrix constituent, said magnetic clusters comprising Tb—Fe and said matrix constituent comprising Al$_2$O$_3$.

14. A method of transferring heat between two spaced apart locations which comprises:

a) Providing a nanocomposite superparamagnetic material;

b) providing an alternating thermal connection between said nanocomposite superparamagnetic material and each of said two spaced apart locations; and c) alternately applying and removing a magnetic field to said nanocomposite superparamagnetic material, and for each field application and removal, alternating the thermal connection in step b) between said nanocomposite superparamagnetic material and each of said two spaced apart location so as to transfer heat between said two spaced apart locations.

15. A method of transferring heat between two spaced apart locations according to claim 14, wherein said two spaced apart locations comprise two reservoirs of a refrigeration system and step c) further comprises transferring heat within said refrigeration system.

16. A method of transferring heat between two spaced apart locations according to claim 15, wherein said two spaced apart locations comprise two reservoirs of a refrigeration system and step c) further comprises transferring heat within said refrigeration system.

17. A method of transferring heat between two spaced apart locations according to claim 14, wherein step a) further comprises providing a nanocomposite superparamagnetic material which includes magnetic clusters that are disposed and separated in a matrix constituent.

18. A method of transferring heat between two spaced apart locations according to claim 17, wherein step a) further comprises providing a nanocomposite superparamagnetic material which includes magnetic clusters that comprise a magnetic material selected from a group consisting of Cr, Mn, Fe, Co, Ni, V, La, Ce, Pr, Nd, Pm, Sm, Eu, Gd, Tb, Dy, Ho, Er, Tm, Yb, Ac, Th, Pa, U, Ne, Pu, Am, Cm, Bk, Cs, Es, Fm, Md, No, Lr, Tb—Fe, Gd—Fe, Nd—Fe, Gd—Co, Er—Ni, U—Co, Fe$_4$N, Fe$_5$N, and Fe$_3$O$_4$.

19. A method of transferring heat between two spaced apart locations according to claim 18, wherein step a) further comprises providing a nanocomposite superparamagnetic material which includes a matrix constituent selected from the group consisting of silica, alumina, yttria, zirconia, hafnia, titania, niobia, Ag, Al, Cu, Si, Au, Pt, Pd, Rh, Ru, Mo, Nb, Ta, W, Ti, V, Zr, Hf, Y, Re, Ir, Ga, In, Sn, Pb, Zn, Cd, Hg, Ag—Al, Cu—Al, Pd—Ag, $Al_2O_3$, $SiO_2$, BN, NbN, TaN, TiN, $Fe_2O_3$, CoO, $Ni_3Al$, and FeAl.

20. A method of transferring heat between two spaced apart locations according to claim 14, wherein step a) further comprises providing a nanocomposite superparamagnetic material which includes magnetic clusters that are disposed and separated in a matrix constituent, said magnetic clusters comprising Tb—Fe and said matrix constituent comprising $Al_2O_3$.

21. In a method for transferring heat by magnetic refrigeration in which the magnetocaloric effect of a magnetic material is used to transfer heat between two reservoirs which are at different temperatures, the improvement wherein said magnetic material comprises a nanocomposite superparamagnetic material.

22. A method for transferring heat according to claim 21, wherein said nanocomposite superparamagnetic material includes magnetic clusters that are disposed and separated in a matrix constituent.

23. A method for transferring heat according to claim 22, wherein said nanocomposite superparamagnetic material includes magnetic clusters that comprise a magnetic material selected from a group consisting of Cr, Mn, Fe, Co, Ni, V, La, Ce, Pr, Nd, Pm, Sm, Eu, Gd, Tb, Dy, Ho, Er, Tm, Yb, Ac, Th, Pa, U, Ne, Pu, Am, Cm, Bk, Cs, Es, Fm, Md, No, Lr, Tb—Fe, Gd—Fe, Nd—Fe, Gd—Co, Er—Ni, U—Co, $Fe_4N$, $Fe_5N$, and $Fe_3O_4$.

24. A method of transferring heat according to claim 23, wherein said nanocomposite superparamagnetic material includes a matrix constituent selected from the group consisting of silica, alumina, yttria, zirconia, hafnia, titania, niobia, Ag, Al, Cu, Si, Au, Pt, Pd, Rh, Ru, Mo, Nb, Ta, W, Ti, V, Zr, Hf, Y, Re, Ir, Ga, In, Sn, Pb, Zn, Cd, Hg, Ag—Al, Cu—Al, Pd—Ag, $Al_2O_3$, $SiO_2$, BN, NbN, TaN, TiN, $Fe_2O_3$, CoO, $Ni_3Al$, and FeAl.

25. A method of transferring heat according to claim 21, wherein said nanocomposite superparamagnetic material includes magnetic clusters that are disposed and separated in a matrix constituent, said magnetic clusters comprising Tb—Fe and said matrix constituent comprising $Al_2O_3$.

26. A method of transferring heat according to claim 21, wherein said nanocomposite superparamagnetic material is moved between said two reservoirs so as to transfer heat therebetween.

27. A method of transferring heat according to claim 26, wherein said nanocomposite superparamagnetic material is moved between said two reservoirs and through a magnetic field so as to transfer heat between said two reservoirs.

28. A method of transferring heat according to claim 27, wherein said nanocomposite superparamagnetic material is moved between said two reservoirs in a linear direction.

29. A method of transferring heat according to claim 27, wherein said nanocomposite superparamagnetic material is moved between said two reservoirs by rotating said nanocomposite superparamagnetic material.

* * * * *

UNITED STATES PATENT AND TRADEMARK OFFICE
CERTIFICATE OF CORRECTION

PATENT NO. : 5,381,664
DATED : January 17, 1995
INVENTOR(S) : BENNETT et al

It is certified that error appears in the above-indentified patent and that said Letters Patent is hereby corrected as shown below:

On the title page, item [75] should read as follows:

--[75] Inventors: Lawrence H. Bennett, Bethesda; Robert D. Shull, Boyds; Lydon J. Swartzendruber, New Carrollton, all of Maryland.--

Signed and Sealed this

Thirtieth Day of May, 1995

Attest:

BRUCE LEHMAN

Attesting Officer         Commissioner of Patents and Trademarks